United States Patent [19]

Rehnberg et al.

[11] 4,400,352
[45] Aug. 23, 1983

[54] METHOD AND A DEVICE FOR OPTIMIZING PURIFICATION OF DIESEL EXHAUST GASES

[75] Inventors: Ove A. Rehnberg, Piteå; Anders J. Sundgren, Luleå, both of Sweden

[73] Assignee: Unikat AB, Sweden

[21] Appl. No.: 269,006

[22] PCT Filed: Oct. 1, 1980

[86] PCT No.: PCT/SE80/00232
§ 371 Date: May 27, 1981
§ 102(e) Date: May 27, 1981

[87] PCT Pub. No.: WO81/00880
PCT Pub. Date: Apr. 2, 1981

[30] Foreign Application Priority Data

Oct. 1, 1979 [SE] Sweden ............................ 7908108

[51] Int. Cl.³ .................................... C01B 21/36
[52] U.S. Cl. ............................... 422/4; 60/39.5; 60/286; 60/298; 60/299; 422/111; 422/168; 423/212; 423/239
[58] Field of Search ............... 422/109, 111, 168, 169, 422/172, 173, 175, 198, 207, 4; 423/212, 213.5, 239, 213.2; 60/39.5, 286, 298, 299, 300, 301

[56] References Cited

U.S. PATENT DOCUMENTS 3,779,015 12/1973 Maruoka .............................. 422/173
4,106,286 8/1978 Sakai et al. ........................... 422/173

FOREIGN PATENT DOCUMENTS 2103705 4/1978 Fed. Rep. of Germany .
49821 12/1931 Norway .
782372 9/1957 United Kingdom .
1340121 12/1973 United Kingdom .

Primary Examiner—Richard L. Chiesa
Attorney, Agent, or Firm—Burns, Doane, Swecker & Mathis

[57] ABSTRACT

This invention relates to a method and a device for optimizing purification of diesel exhaust gases, the purification being carried out by using a catalyst.

It is the object of the present invention to avoid the development of $NO_2$ in the catalyst at the same time as the contents of carbon monoxide (CO) and hydrocarbons are maintained at a low level.

This object is accomplished by adjusting the temperature of the exhaust gases when they pass the catalyst. The adjustment is carried out by finely divided injection of some cooling medium into the exhaust gases.

6 Claims, 3 Drawing Figures

METHOD AND A DEVICE FOR OPTIMIZING PURIFICATION OF DIESEL EXHAUST GASES

This invention relates to a method and a device for optimizing purification of diesel exhaust gases, the purification being carried out by using a catalyst.

The diesel exhaust gases are today one of the most serious environmental problems on the work places, especially when diesel operation is used in closed rooms, e.g. mines, storerooms, ships etc. Moreover, a great increase of the number of diesel-driven private cars in traffic above ground is expected in the future. Due to this the diesel exhaust gases are likely to be an environmental problem above ground, at least in the cities.

A known technique for reducing the problems with the discharge of the exhaust gases is connecting special exhaust gas purifiers to the exhaust system. So-called catalytic purifiers are often used, the catalyst compound of which consists up to 99% of alumina, the rest being the active metal, mostly platinum. The good eliminating effect of the catalysts on carbon monoxide (CO) and hydrocarbons (HC) is well documented.

However, in recent years it has been often discussed, particularly in mine circles, whether catalysts are justified. There are several reasons for this, i.e. sometimes an increased content of the dangerous nitrogen dioxide ($NO_2$) and also bad HC/CO-purification in certain cases. The nitrogen dioxide ($NO_2$) is the gas component according to which ventilation is dimensioned under ground.

It is the object of the present invention to prevent an increase of $NO_2$ in the exhaust gases and also to eliminate CO/HC effectively. Reduced irritation of nose and ears is also obtained.

BRIEF DESCRIPTION OF THE DRAWINGS

One example of the invention will be illustrated below with reference to the enclosed drawings, where.

DETAILED DESCRIPTION OF THE PREFERRED EMBODIMENT

Figure 1:
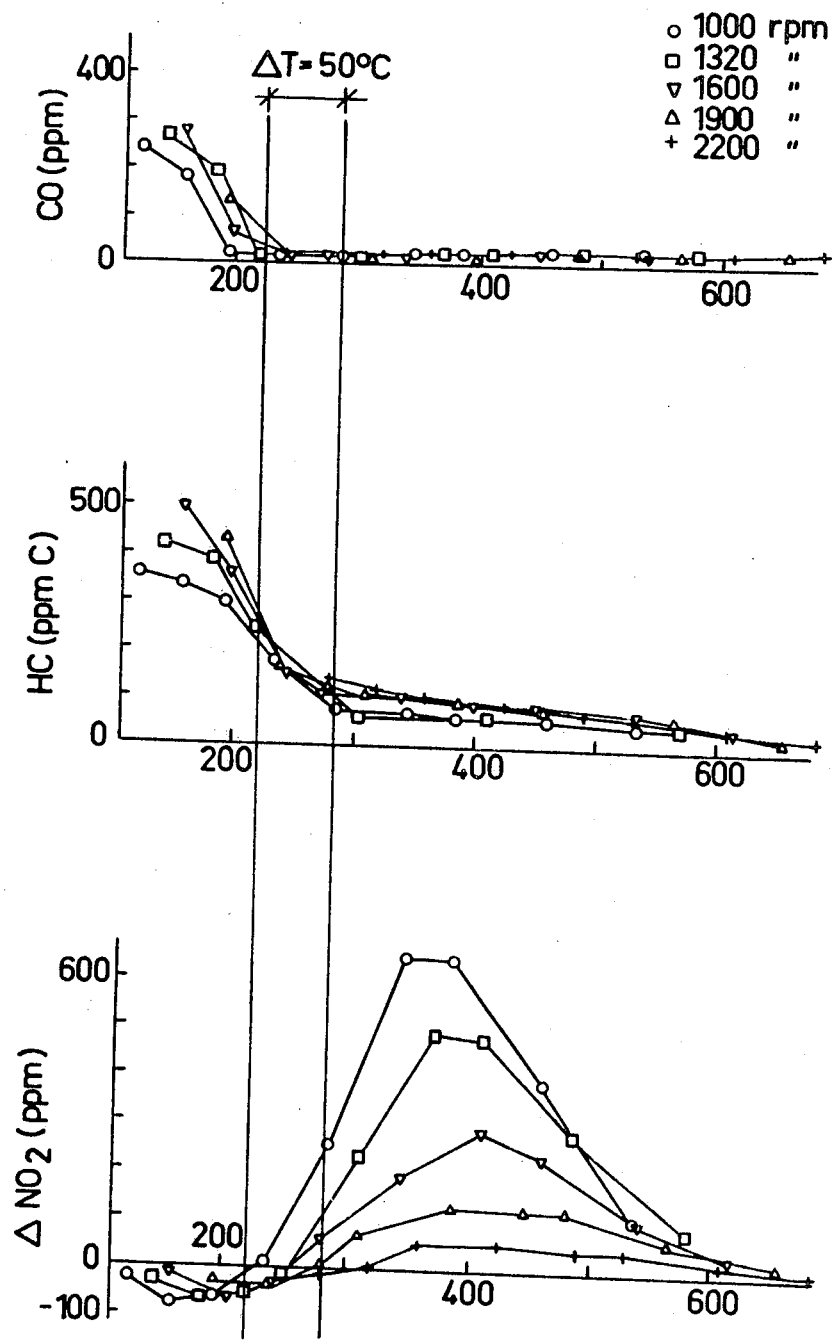
FIG. 1 is a graphic illustration of the CO- and HC-contents and the $NO_2$-change in a catalyst as a function of the exhaust gas temperature at different r.p.m.

In order to explain the theory behind the present invention reference is made to the diagrams in FIG. 1. These show the contents of CO and HC after a catalyst and the $NO_2$-change ($\Delta NO_2$) in the same catalyst as a function of the exhaust gas temperature at different r.p.m.

The uppermost diagram shows the CO-content as a function of the exhaust gas temperature. It can be read from this diagram that the CO-content is very low when the exhaust gas temperature exceeds about 250° C.

The diagram in the middle shows the HC-content as a function of the exhaust gas temperature. It is evident that the HC-content will decrease with increasing exhaust gas temperature up to about 250°–300° C. The HC-content will then be substantially constant even if the exhaust gas temperature increases.

In the lowermost diagram of $NO_2$-change ($\Delta NO_2$) in the catalyst is shown as a function of the exhaust gas temperature. At low exhaust gas temperatures, $<250°$ C., the $NO_2$-change is negative, i.e. $NO_2$ is converted into NO and $O_2$. However, when the exhaust gas temperature exceeds 250° C. a great increase of $NO_2$ will appear, which increase continues until the exhaust gases have reached a temperature of 350°–400° C. At a still higher exhaust gas temperature a reduction of $NO_2$ will then appear again.

Figure 2:
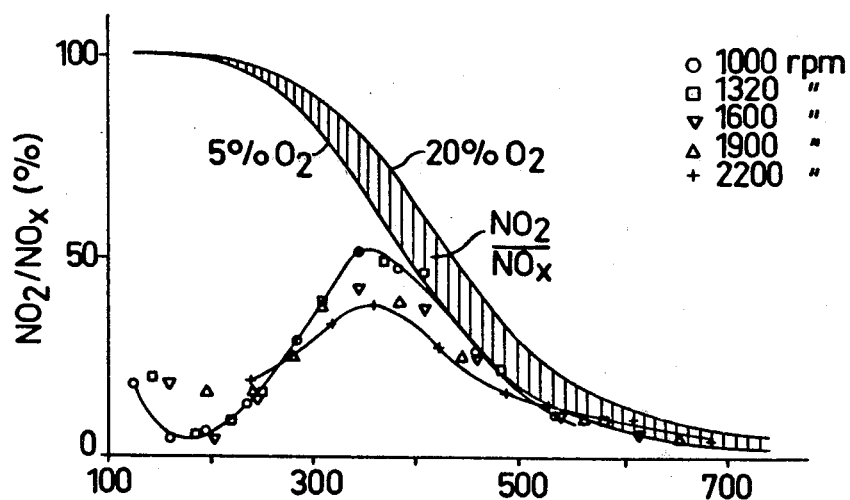
FIG. 2 is a graph showing the ratio of $NO_2$ to $NO_x$ ($=NO_2+NO$) in the exhaust gases after a catalyst as a function of the exhaust gas temperature at different r.p.m.

In FIG. 2 the $NO_2/NO_x$ ($=NO_2+NO$) ratio in the exhaust gases after a catalyst is shown as a function of the exhaust gas temperature at different r.p.m. Only the points of measurement of the minimum and maximum r.p.m. have been connected. The range marked with vertical lines indicates the calculated $NO_2/NO_x$ ratio at equilibrium and typical oxygen contents in diesel exhaust gases, 5–20%.

It is apparent from FIG. 2 that the $NO_2/NO_x$ ratio will rise very much from 200° C. up to about 300° C. exhaust gas temperature. The $NO_2/NO_x$ ratio will then decrease with still increasing exhaust gas temperature.

If FIG. 1 is specially studied it is realised that the contents of CO and HC as well as the $NO_2$-increase will be very moderate if the exhaust gas temperature can be maintained within a certain range, e.g. 230°–280° C.

By adjusting the temperature of the exhaust gases before they enter the catalyst the temperature can be maintained within the desired temperature range of the exhaust gases, e.g. within the range of 230°–280° C. shown in FIG. 1.

Figure 3:
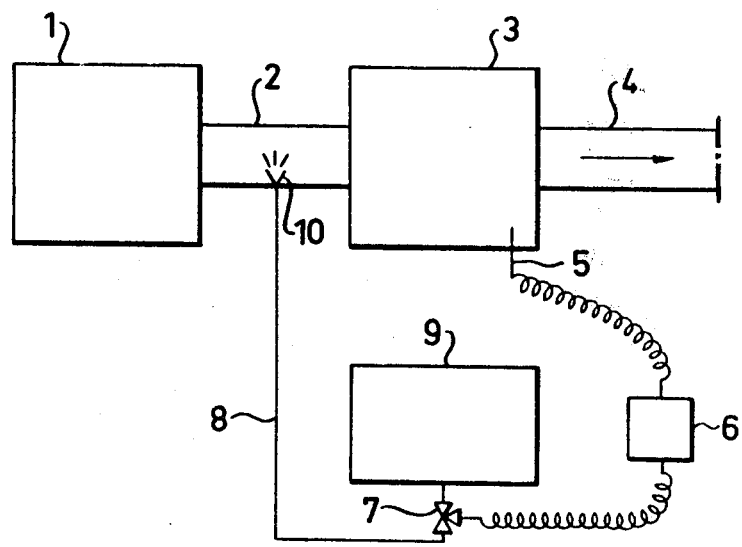
FIG. 3 is a schematic view of the construction of a device according to the invention.

In FIG. 3 it is shown schematically how a device according to the invention can be constructed.

An exhaust pipe 2 leads from an engine 1 to a catalyst 3. An exhaust gas outlet pipe 4 leads from the catalyst 3.

In the catalyst 3 a thermoelement 5 is arranged, which actuates a valve 7 via adjusting equipment 6.

The valve 7 is arranged in a conduit 8 leading from a pressurized water tank 9 to the exhaust pipe 2, where the conduit 8 terminates in a nozzle 10 arranged within the exhaust pipe 2.

The system described above operates as follows.

The thermoelement 5 arranged in the catalyst 3 emits signals to the adjusting equipment 6 concerning the temperature of the exhaust gases. If this temperature exceeds a predetermined maximum value the adjusting equipment 6 opens the valve 7 and water will flow from the tank 9 via the conduit 8 to the nozzle 10 where it is finely divided into the flow of exhaust gas from the engine 1 to the catalyst 3.

Due to the injection of water into the exhaust gas flow the temperature of the exhaust gas will of course be lower. When the exhaust gas temperature measured by the adjusting equipment via the thermoelement 5 has decreased to a predetermined minimum value said equipment 6 will close the valve 7, the injection of water into the exhaust pipe 2 being terminated.

Thus, by controlling all the time that the exhaust gas temperature is within a predetermined range an extremely effective exhaust gas purification is achieved.

Instead of using water for reducing the temperature of the exhaust gases you can also use some other suitable agent.

The invention is by no means limited to the embodiment described above but can be freely varied within the scope of the following claims.

What is claimed is:

1. A method of optimizing purification of diesel exhaust gases particularly with regard to $NO_2$, the exhaust gas purification being carried out by a catalyst, comprising selectively reducing the exhaust gas temperature by injecting an agent having a lower temperature than the exhaust gases into the exhaust gases before the gases enter the catalyst such that the temperature within the catalyst remains within a predetermined low temperature range of 230°–280° C. which minimizes the quantity of $NO_2$ leaving the catalyst.

2. The method of claim 1, wherein the agent is water.

3. A device for optimizing purification of diesel exhaust gases particularly with regard to $NO_2$, comprising a diesel engine, catalyst means for purifying the exhaust gases, means for measuring the temperature of the exhaust gases in the catalyst means, means for selectively adding a substance to the exhaust gases in dependence on the measured temperature before the exhaust gases enter the catalyst to cool said gases and to maintain said gases in the catalyst within a predetermined low temperature range of 230°–280° C., said substance having a lower temperature than the exhaust gases, whereby the quantity of $NO_2$ leaving the catalyst is minimized.

4. The device of claim 3, wherein the measuring means is a temperature sensor arranged within the catalyst means.

5. The device of claim 3 or 4, wherein the means for selectively adding the substance to the exhaust gases comprise an adjusting equipment which is connected to the measuring means for the temperature, a pressurized tank containing a liquid, a conduit leading from the tank to an exhaust pipe carrying the gases to the catalyst means, and a valve arranged in the conduit, said valve being actuated by the adjusting equipment.

6. The device of claim 5, further comprising a nozzle arranged at the outlet of the conduit within the exhaust pipe.

* * * * *